US009591258B2

(12) United States Patent
Matsuyama (10) Patent No.: US 9,591,258 B2
(45) Date of Patent: Mar. 7, 2017

(54) IMAGE PROCESSING APPARATUS, IMAGE PROCESSING METHOD, PROGRAM AND STORAGE MEDIUM

(71) Applicant: CANON KABUSHIKI KAISHA, Tokyo (JP)

(72) Inventor: Kazunori Matsuyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 62 days.

(21) Appl. No.: 14/570,273

(22) Filed: Dec. 15, 2014

(65) Prior Publication Data

US 2015/0181159 A1 Jun. 25, 2015

(30) Foreign Application Priority Data

Dec. 20, 2013 (JP) ................. 2013-263903

(51) Int. Cl.
| | |
|---|---|
| *H04N 7/01* | (2006.01) |
| *G06K 9/46* | (2006.01) |
| *H04N 5/14* | (2006.01) |
| *G06T 7/20* | (2006.01) |
| *H04N 5/205* | (2006.01) |

(52) U.S. Cl.
CPC ......... *H04N 7/0145* (2013.01); *G06K 9/4642* (2013.01); *G06T 7/206* (2013.01); *H04N 5/144* (2013.01); *G06T 2207/30221* (2013.01); *H04N 5/205* (2013.01); *H04N 7/014* (2013.01)

(58) Field of Classification Search
CPC ...... H04N 7/0145; H04N 7/014; H04N 5/144; H04N 5/205; G06K 9/4642; G06T 7/206; G06T 2207/30221

USPC ......................................... 382/191
See application file for complete search history.

(56) References Cited

U.S. PATENT DOCUMENTS

| | | | | |
|---|---|---|---|---|
| 6,898,243 | B1 * | 5/2005 | Alvarez | H04N 7/0137 348/E7.014 |
| 7,180,548 | B2 | 2/2007 | Mishima et al. | |
| 7,295,612 | B2 * | 11/2007 | Haskell | H04N 19/147 375/240.15 |
| 2004/0246374 | A1 | 12/2004 | Mishima et al. | |
| 2008/0165276 | A1 * | 7/2008 | Edanami | H04N 5/145 348/448 |
| 2010/0053345 | A1 * | 3/2010 | Kim | H04N 5/232 348/208.4 |
| 2010/0157146 | A1 * | 6/2010 | Jung | H04N 7/012 348/446 |
| 2010/0277512 | A1 * | 11/2010 | Shen | G09G 3/2025 345/690 |

FOREIGN PATENT DOCUMENTS

| | | |
|---|---|---|
| JP | 2004-297719 A | 10/2004 |
| JP | 2012-94960 A | 5/2012 |

* cited by examiner

*Primary Examiner* — Jon Chang
(74) *Attorney, Agent, or Firm* — Fitzpatrick, Cella, Harper & Scinto (57) ABSTRACT

To enable a high-quality image process while reducing power consumption, an image processing apparatus is characterized by acquiring a plurality of image frames constituting a moving image; detecting a feature quantity of the image frame; determining the number of image frames to be used for the image process of the image frame, based on the detected feature quantity; and performing the image process to a process-object frame, by using the image frames corresponding to the determined number of image frames.

11 Claims, 8 Drawing Sheets

| NO. | MOVEMENT | HIGH-FREQUENCY COMPONENT | BRIGHTNESS | IMAGE PROCESSING MODE AND IMAGE QUALITY EVALUATION ||| SETTING |
|---|---|---|---|---|---|---|---|
| | | | | MODE A | MODE B | MODE C | |
| 1 | NONE | FEW | DARK | ◎ | ◎ | ◎ | A |
| 2 | MEDIUM | FEW | DARK | ◎ | ◎ | ◎ | A |
| 3 | NUMEROUS | FEW | DARK | ◎ | ◎ | ◎ | A |
| 4 | NONE | INTERMEDIATE | DARK | ○ | ◎ | ◎ | B |
| 5 | MEDIUM | INTERMEDIATE | DARK | ○ | ◎ | ◎ | B |
| 6 | NUMEROUS | INTERMEDIATE | DARK | ◎ | ◎ | ◎ | A |
| 7 | NONE | LARGE | DARK | ○ | ◎ | ◎ | B |
| 8 | MEDIUM | LARGE | DARK | ○ | ◎ | ◎ | B |
| 9 | NUMEROUS | LARGE | DARK | ○ | ◎ | ◎ | B |
| 10 | NONE | FEW | INTERMEDIATE | △ | ◎ | ◎ | B |
| 11 | MEDIUM | FEW | INTERMEDIATE | △ | ◎ | ◎ | B |
| 12 | NUMEROUS | FEW | INTERMEDIATE | ○ | ◎ | ◎ | B |
| 13 | NONE | INTERMEDIATE | INTERMEDIATE | △ | ◎ | ◎ | B |
| 14 | MEDIUM | INTERMEDIATE | INTERMEDIATE | △ | ○ | ◎ | C |
| 15 | NUMEROUS | INTERMEDIATE | INTERMEDIATE | ○ | ○ | ◎ | C |
| 16 | NONE | LARGE | INTERMEDIATE | △ | ◎ | ◎ | B |
| 17 | MEDIUM | LARGE | INTERMEDIATE | △ | ○ | ◎ | C |
| 18 | NUMEROUS | LARGE | INTERMEDIATE | ○ | ○ | ◎ | C |
| 19 | NONE | FEW | BRIGHT | △ | ◎ | ◎ | B |
| 20 | MEDIUM | FEW | BRIGHT | △ | ◎ | ◎ | B |
| 21 | NUMEROUS | FEW | BRIGHT | ○ | ◎ | ◎ | B |
| 22 | NONE | INTERMEDIATE | BRIGHT | △ | ◎ | ◎ | B |
| 23 | MEDIUM | INTERMEDIATE | BRIGHT | △ | ○ | ◎ | C |
| 24 | NUMEROUS | INTERMEDIATE | BRIGHT | ○ | ○ | ◎ | C |
| 25 | NONE | LARGE | BRIGHT | △ | ◎ | ◎ | B |
| 26 | MEDIUM | LARGE | BRIGHT | △ | ○ | ◎ | C |
| 27 | NUMEROUS | LARGE | BRIGHT | ○ | ○ | ◎ | C |

| NO. | MOVEMENT | HIGH-FREQUENCY COMPONENT | BRIGHTNESS | IMAGE PROCESSING MODE AND IMAGE QUALITY EVALUATION | | | | SETTING |
|---|---|---|---|---|---|---|---|---|
| | | | | MODE D | MODE E | MODE F | MODE G | |
| 1 | NONE | FEW | DARK | ◎ | ◎ | ◎ | ◎ | D |
| 2 | SMALL | FEW | DARK | ◎ | ◎ | ◎ | ◎ | D |
| 3 | LARGE | FEW | DARK | ◎ | ◎ | ◎ | ◎ | D |
| 4 | NONE | INTERMEDIATE | DARK | ○ | ◎ | ◎ | ◎ | E |
| 5 | SMALL | INTERMEDIATE | DARK | ○ | ◎ | ◎ | ◎ | E |
| 6 | LARGE | INTERMEDIATE | DARK | ○ | ◎ | ◎ | ◎ | E |
| 7 | NONE | LARGE | DARK | ○ | ◎ | ◎ | ◎ | E |
| 8 | SMALL | LARGE | DARK | ○ | ○ | ○ | ◎ | G |
| 9 | LARGE | LARGE | DARK | ○ | ○ | ◎ | ◎ | F |
| 10 | NONE | FEW | INTERMEDIATE | △ | ◎ | ◎ | ◎ | E |
| 11 | SMALL | FEW | INTERMEDIATE | △ | △ | ◎ | ◎ | F |
| 12 | LARGE | FEW | INTERMEDIATE | △ | △ | ◎ | ◎ | F |
| 13 | NONE | INTERMEDIATE | INTERMEDIATE | △ | ◎ | ◎ | ◎ | E |
| 14 | SMALL | INTERMEDIATE | INTERMEDIATE | △ | △ | ◎ | ◎ | F |
| 15 | LARGE | INTERMEDIATE | INTERMEDIATE | △ | △ | ◎ | ◎ | F |
| 16 | NONE | LARGE | INTERMEDIATE | △ | ◎ | ◎ | ◎ | E |
| 17 | SMALL | LARGE | INTERMEDIATE | △ | △ | ◎ | ◎ | F |
| 18 | LARGE | LARGE | INTERMEDIATE | △ | △ | ○ | ◎ | G |
| 19 | NONE | FEW | BRIGHT | △ | ◎ | ◎ | ◎ | E |
| 20 | SMALL | FEW | BRIGHT | △ | △ | ◎ | ◎ | F |
| 21 | LARGE | FEW | BRIGHT | △ | △ | ◎ | ◎ | F |
| 22 | NONE | INTERMEDIATE | BRIGHT | △ | ◎ | ◎ | ◎ | E |
| 23 | SMALL | INTERMEDIATE | BRIGHT | △ | △ | ◎ | ◎ | F |
| 24 | LARGE | INTERMEDIATE | BRIGHT | △ | △ | ○ | ◎ | G |
| 25 | NONE | LARGE | BRIGHT | △ | ◎ | ◎ | ◎ | E |
| 26 | SMALL | LARGE | BRIGHT | △ | △ | ◎ | ◎ | F |
| 27 | LARGE | LARGE | BRIGHT | △ | △ | ○ | ◎ | G |

IMAGE PROCESSING APPARATUS, IMAGE PROCESSING METHOD, PROGRAM AND STORAGE MEDIUM

BACKGROUND OF THE INVENTION

Field of the Invention

The present invention relates to an image processing apparatus which is particularly suitable to perform an image process using a reference frame, an image processing method which is performed by the image processing apparatus, a program which enables the image processing apparatus to perform the image processing method, and a storage medium which stores therein the program.

Description of the Related Art

Conventionally, as a general video process, an image process in which a plurality of frame images of different input times are used is performed. For example, in an IP (Interlace-Progressive) converting process, as in the method by Japanese Patent Application Laid-Open No. 2012-094960, a plurality of field images are read out of a memory, and used as reference images for constituting an image of an interpolation line. Moreover, in case of creating an interpolation image when converting a frame rate, as in the method by Japanese Patent Application Laid-Open No. 2004-297719, a process in which detection results of movement vectors of a plurality of frames before and after the interpolation image to be created are used is performed. In general, it is possible, by performing matching of corresponding points with reference to a larger number of frames and thus improving matching accuracy, to constitute a higher-accuracy interpolation image.

In general, if the number of frames to be referred is increased, many memory accesses are required, thereby increasing power consumption. In the video processing apparatus, if an image processing mode is set, then an image process is performed by referring to as many frames as the number according to the set modes. In a case where an image processing mode by which optimum image quality can be obtained is set, the frame images of which the number according to the set mode are read from the memory, and a suitable process is selected according to the feature of an area, and then the image process is actually performed. However, effectiveness of process effect is different according to the feature of an input image. More specifically, a significant difference may not occur in the processed results between a case where the process is performed by an image processing algorithm in which many frames are referred and a case where the process is performed by an image processing algorithm in which the frames of which the number is smaller than that in the former case are referred.

For example, in a frame rate converting process, if a still image is processed, it only has to repetitively output one frame without referring to a plurality of frames. Besides, if an interpolation image of the frame rate converting process is generated for a frame in which a light-dark difference is large within one frame, attention tends to be drawn to the light portion. Therefore, it is difficult to perceive deterioration of image quality in the dark portion even if the image process in which smaller number of frames are referred is performed. In other words, even in a case where the image process is performed by performing many memory accesses, the result obtained in this process may become the same degree as that in the case where the image process in which smaller number of frames are referred is performed. As a result, in this case, even when obtaining the image quality of the same degree, electric power is extra consumed to the extent that many accesses are performed.

The present invention has been completed in consideration of such problems as described above, and an object thereof is to enable a high-quality image process while reducing power consumption.

SUMMARY OF THE INVENTION

An image processing apparatus according to the present invention is characterized by comprising: an acquiring unit configured to acquire a plurality of image frames constituting a moving image; a detecting unit configured to detect a feature quantity of the image frame; a determining unit configured to determine the number of image frames to be used for an image process of the image frame, based on the detected feature quantity; and an image processing unit configured to perform the image process to a process-object frame, by using the image frames corresponding to the number of image frames determined by the determining unit.

According to the present invention, it is possible to perform a high-quality image process while reducing power consumption.

Further features of the present invention will become apparent from the following description of exemplary embodiments with reference to the attached drawings.

DESCRIPTION OF THE EMBODIMENTS (First Embodiment)

Hereinafter, the first embodiment of the present invention will be described with reference to the attached drawings.

Figure 1:
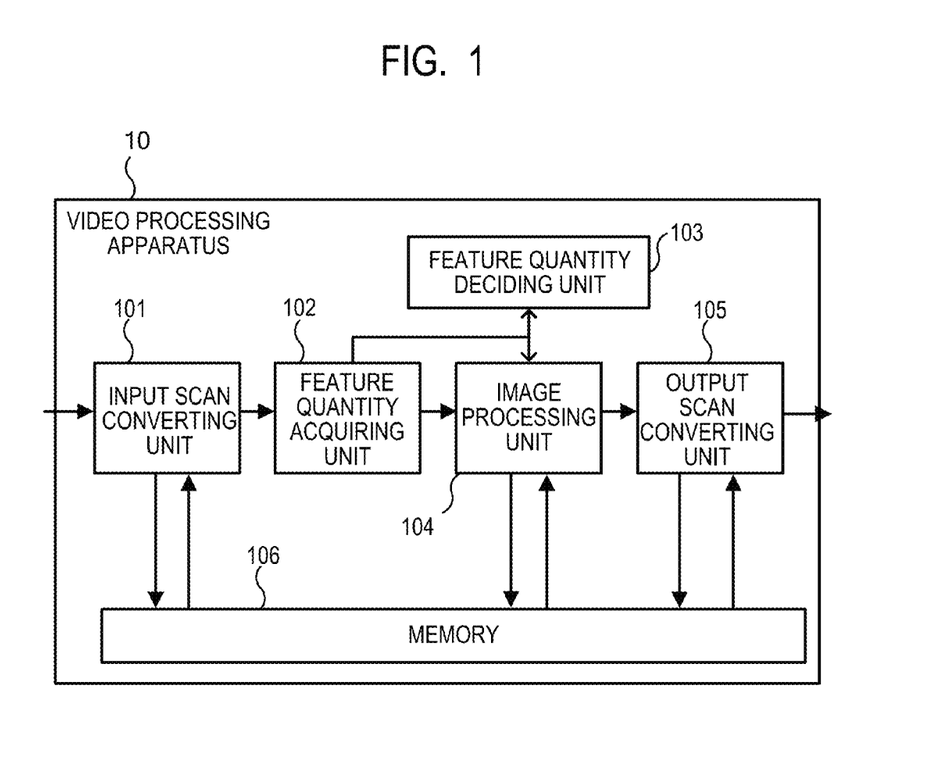
FIG. 1 a block diagram illustrating an internal constitution example of a video processing apparatus according to a first embodiment of the present invention.
Figure 2A:
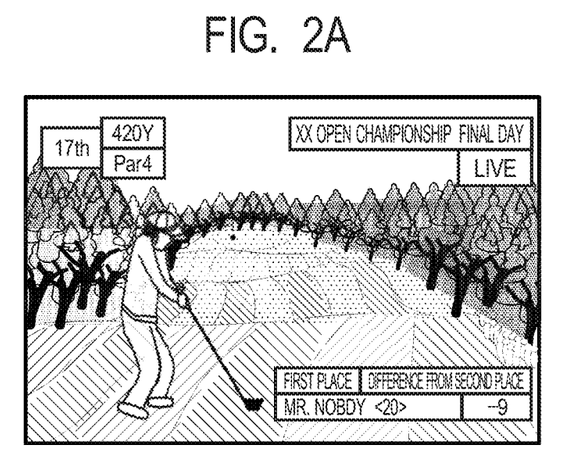
FIGS. 2A and 2B are diagrams illustrating an example that an image is divided into a plurality of rectangular areas.
Figure 2B:
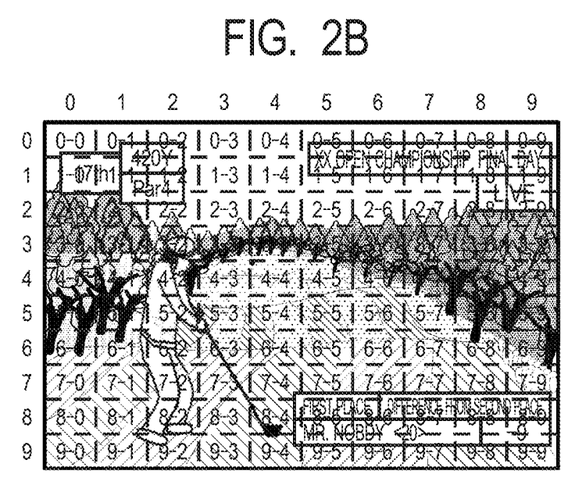

FIG. 1 is a block diagram illustrating an internal constitution example of a video processing apparatus 10 in the present embodiment. In FIG. 1, frame images of a moving image are input in an input scan converting unit 101 as video signals. The input scan converting unit 101 scans and converts the video signal and controls so as to divide the frame image into a plurality of rectangular areas as illustrated in FIG. 2B. Hereinafter, it will be described under the condition that an image illustrated in FIG. 2A is divided in horizontal and vertical directions into ten parts respectively to be totally divided into one hundred rectangular areas.

A scan converting process is performed by changing the order of access to a memory 106 between the time of writing data and the time of reading data. In the scan converting process, a reading process is performed by having an area, where an adjacent portion of an effective area of an adjacent area is overlapped by a fixed range, on the periphery of an effective area illustrated in each of FIGS. 2A and 2B. Images in respective rectangular areas formed by the scan converting process are respectively input in a feature quantity acquiring unit 102. Further, a plurality of frames, which are different in time lag, to be used for the reference are temporarily stored in the memory 106.

The feature quantity acquiring unit 102 acquires feature quantities of the respective rectangular areas. In the present embodiment, although it will be described under the condition that the statistic amount of brightness and frequency components and a movement vector between an n-th frame which was input and a past (n−1)-th frame are acquired as the feature quantities, the feature quantities are not limited to these examples. In case of acquiring difference of a frame, a three dimensional noise reduction process or the like may be performed to the n-th frame on the basis of information of the (n−1)-th frame which was read out. In case of acquiring a movement vector, the movement vector can be detected by using a method of performing the block matching between frames or a movement estimation method of using a gradient method. The respective feature quantities acquired at the feature quantity acquiring unit 102 are transferred to a feature quantity deciding unit 103, and an image in a rectangular area of the n-th frame is output to an image processing unit 104.

The feature quantity deciding unit 103 performs the deciding and the setting of an operation mode of the image processing unit 104 on the basis of each of the feature quantities acquired from the feature quantity acquiring unit 102. The feature quantity deciding unit 103 classifies video signals, which were input, on the basis of the feature quantities acquired at the feature quantity acquiring unit 102 and decides an image processing mode capable of obtaining the most suitable result by the minimum number of reference frames in image processing modes of the image processing unit 104. The details of a deciding method of this image processing mode in the present embodiment will be described later. As a result of this decision, an image processing mode capable of obtaining the most suitable result in aspects of image quality and the power consumption is selected and set to the image processing unit 104.

The image processing unit 104 reads out frames, of which the number corresponds to an image processing algorithm, from the memory 106 and performs an image process to an image of rectangular area which was input. The image processing unit 104 can perform an image process by a plurality of image processing modes of the different number of reference frames and can set a different mode every rectangular area. In the present embodiment, it will be described about the configuration to be applied to an IP converting process as an example of an image process. As for an IP conversion algorithm or an implementing method, it is assumed to use a known method.

In the present embodiment, as image processing modes, there are three modes of mode A, mode B and mode C implementing IP conversion algorithms of the different number of reference frames.

When the image processing mode is the mode A, the image processing unit 104 reads out only the n-th frame, which is a process-object frame, from the memory 106 and performs an intra-frame IP converting process. In the case of an interlace signal, although a video image, wherein pixels of lines different every one frame are thinned out with an interval of one line, is input, the thinned out pixel value is generated by performing interpolation from the upper and lower effective lines in the intra-frame IP converting process. Therefore, an image, wherein the frequency components in the vertical direction are reduced, is obtained as a processed result as compared with a case, where the same image is input by a progressive signal. Considering from this feature, when the mode A is used, an IP converting process for an image with less high frequency components can be excellently performed. In addition, when a process has been performed to a dark area, since deterioration of a processed result is not conspicuous as compared with a processed result for a bright area, a comparatively excellent result can be obtained.

When the image processing mode is the mode B, the (n−1)-th frame, which was input one frame before, is read out from the memory 106 as a reference image for a process of the present n-th frame, and a movement-adaptive IP converting process is performed. In case of a process of the mode B, since an image of before interlacing can be reconfigured by synthesizing two sequential frames in a still image area, image quality equivalent to that of a progressive image can be obtained. In addition, since an intra-frame interpolating process is performed for a movement area, a processed result in the movement area is almost equivalent to a processed result of the mode A, and a video image, of which the high frequency components are reduced in the vertical direction, can be obtained. Considering from this feature, when the mode B is used, an excellent result can be obtained in an IP converting process for the still image area and an IP converting process for the video image with less high frequency components.

When the image processing mode is the mode C, the (n−1)-th frame and a (n−2)-th frame are read out from the memory 106 in order to perform the IP converting process of the present n-th frame, and an IP converting process of considering a movement vector is performed. In the still image area, an image equivalent to that in case of performing an input by a progressive method can be obtained by synthesizing the n-the frame and the (n−1)-th frame. For the movement area, a movement vector is calculated by using frames from the n-th frame to the (n−2)-th frame which were read out from the memory 106, and an interpolation image of the n-th frame is generated by performing an interpolation image creation of using the movement vector. In this mode C, the most excellent result can be obtained in a moving video process as compared with cases of the mode A and the mode B.

The three image processing modes of the image processing unit 104 are respectively and individually set every image of a rectangular area on the basis of a decided result of the feature quantity deciding unit 103. When the IP converting process is performed by the image processing mode which was set, an image of a rectangular area, which was input, is output to an output scan converting unit 105.

According to a selecting situation of the image processing mode, an operation of a memory access unit or an image processing circuit (not illustrated), which is not used in the image processing unit 104, is stopped by the clock gating or the like, and it may be configured to reduce the power consumption.

The output scan converting unit 105 outputs images of rectangular areas, which were divided at the input scan converting unit 101 and respectively processed in a video processing apparatus 10, to the outside of the video processing apparatus 10 after converting to an output scanning system of the video processing apparatus 10. In a scan converting process, it is performed by changing the order of access to the memory 106 between the time of writing data and the time of reading data as described before.

Figure 3:
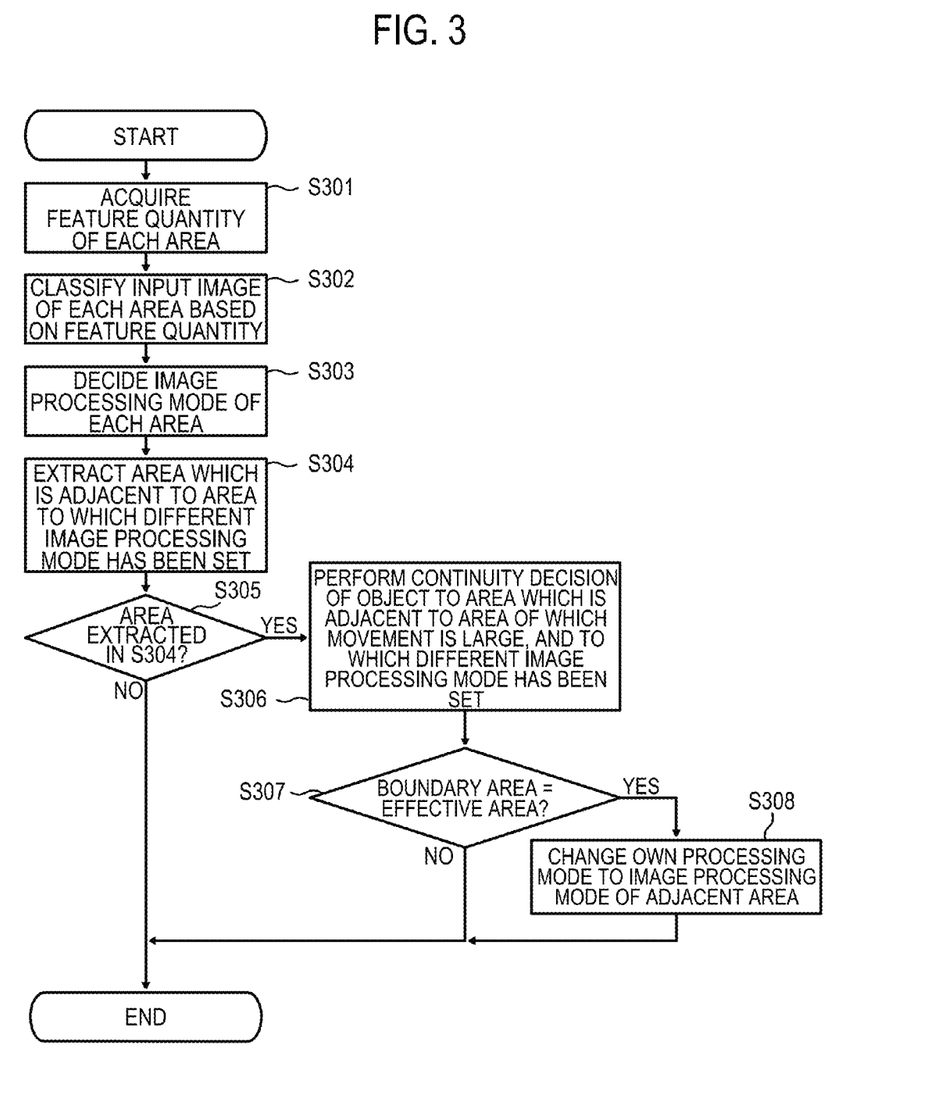
FIG. 3 is a flow chart indicating an example of a processing procedure of deciding an image processing mode of an IP converting process in the embodiment of the present invention.

FIG. 3 is a flow chart indicating an example of a processing procedure of deciding an image processing mode in the present embodiment. First, in S301, the feature quantity acquiring unit 102 acquires the feature quantity of an image of each rectangular area.

Next, in S302, classification of input images is performed in accordance with the feature quantity acquired in S301. Specifically, the feature quantity deciding unit 103 sets a predetermined threshold every the feature quantity acquired in the feature quantity acquiring unit 102 and classifies the images of rectangular areas which were input.

Figure 4:
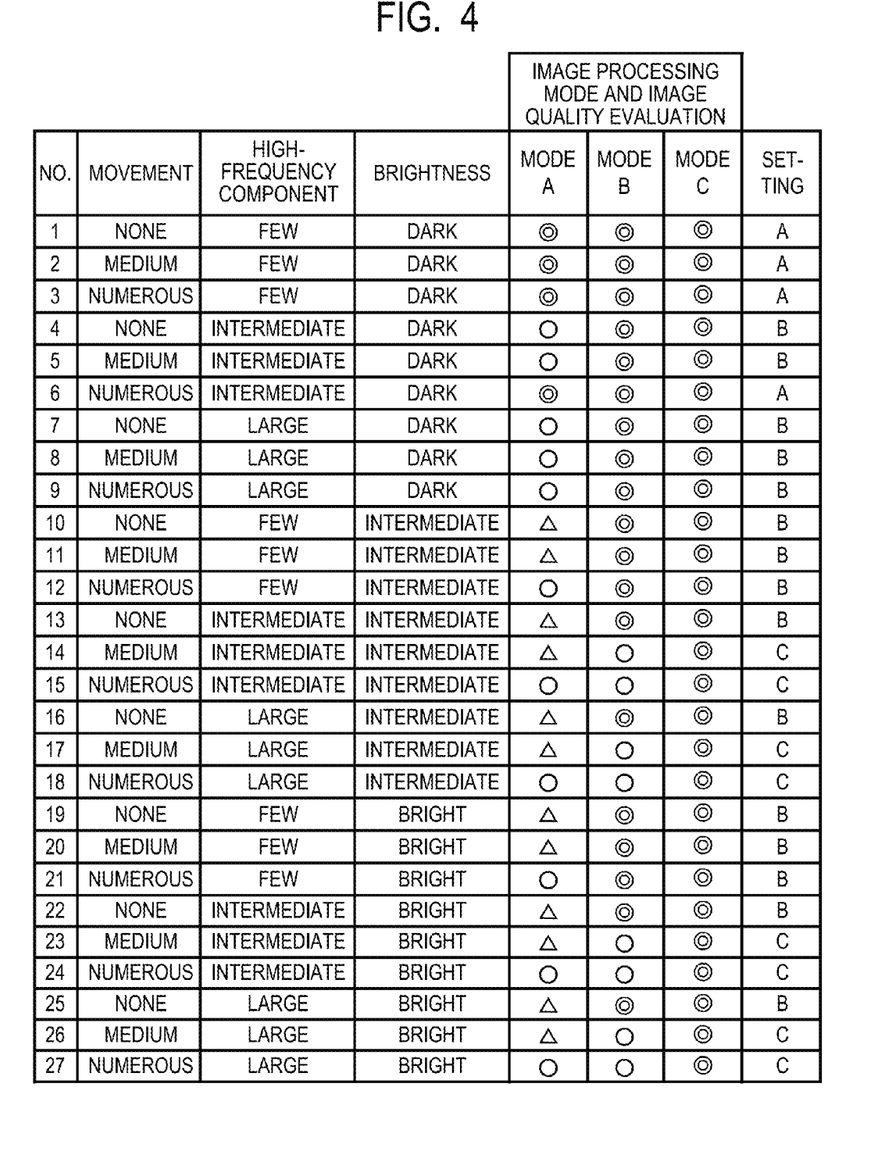
FIG. 4 is a diagram illustrating classification based on image feature quantities in the IP converting process and results obtained by processes in respective processing modes.

FIG. 4 is a diagram indicating an example of a classification table in the present embodiment. In the present embodiment, two thresholds are respectively set for three feature quantities, which are the statistic amount of brightness and frequency components and a movement vector acquired in the feature quantity acquiring unit 102, to be respectively classified into three kinds. As a result of classification, images are classified into classification Nos. 1 to 27 in accordance with the feature quantities of images of the divided rectangular areas as indicated in FIG. 4.

Next, in S303, the feature quantity deciding unit 103 decides an image processing mode for an image of each rectangular area classified in S302. Here, results processed with the image processing modes A to C are previously acquired for the images of the classification Nos. 1 to 27, and the decision of a processed effect in each classification is performed by evaluation values according to various image deciding methods.

For example, in case of the IP converting process, the deterioration degree of image quality can be decided by a PSNR (Peak Signal to Noise Ratio) evaluation of an image of before interlacing and an image after the IP conversion of an interlaced video image. A threshold, which is to be set in case of performing the classification, is set by a method that a boundary value, for which a significant difference appears in an image processed result in each mode, is calculated from the processed result. The decided result of an image process in FIG. 4 indicates that the image quality is excellent in the order of Δ<○<◉.

In FIG. 4, for example, in images which belong to the classification Nos. 1 to 3, the significant difference is not observed in the processed result of the IP conversion of using the modes A to C. In this case, an image processing mode of the image processing unit 104 is selected so as to perform the IP converting process by using the mode A with the minimum power consumption and the minimum number of frames to be read out from the memory 106. For example, in images which belong to the classification Nos. 4 and 5, although there is not the difference in the processed results of the modes B and C, the both modes can obtain results more suitable than a case of the IP converting process performed with the mode A. Therefore, the image processing mode of the image processing unit 104 is selected so as to perform the IP converting process by using the mode B, of which the number of frames to be read out from the memory 106 is smaller than that of the other mode.

Figure 5:
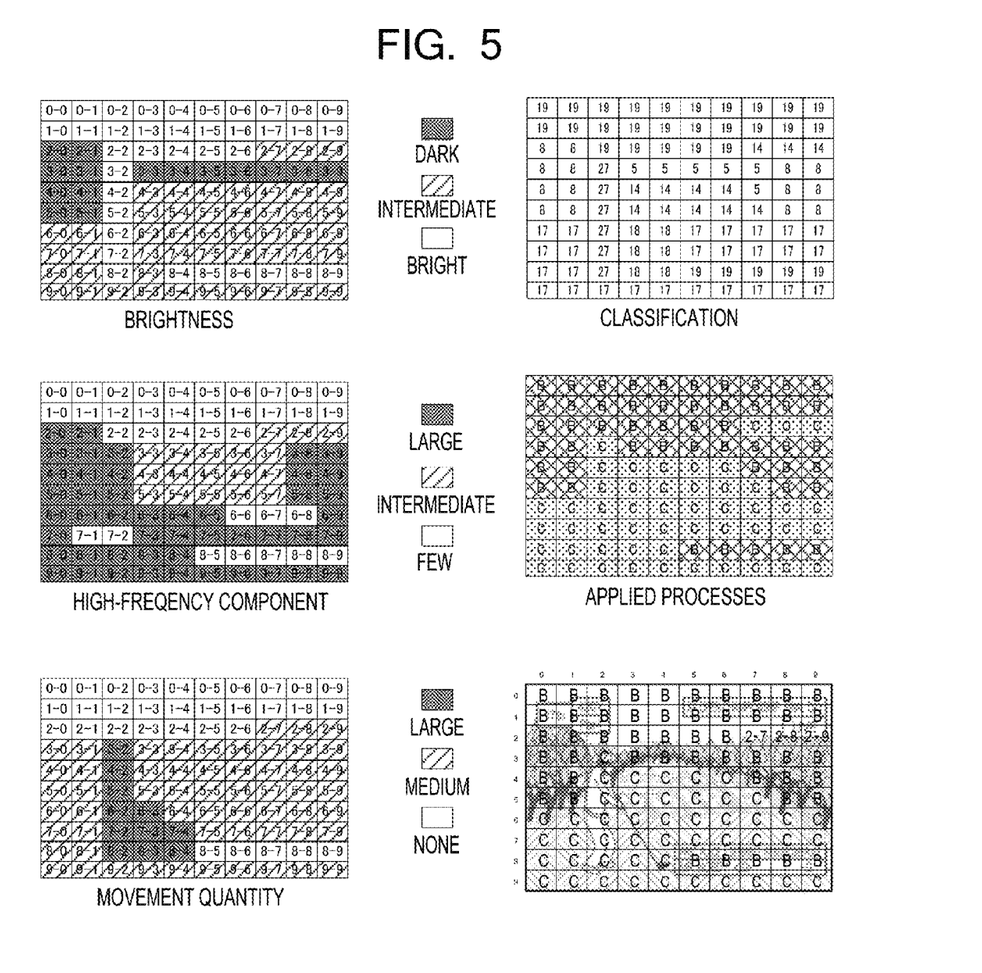
FIG. 5 is a diagram illustrating an example of relation of the feature quantity, the classification, and the image processing mode to be selected.

For example, in images which belong to the classification Nos. 26 and 27, since the processed result by the mode C is more suitable than that by the modes A and B, the image processing mode of the image processing unit 104 is selected so as to perform the IP converting process by using the mode C. In FIG. 5, the feature quantity of each area, classification of each area based on the above deciding method and a result of an image processing mode to be set are indicated.

Next, in S304, an area, which is adjacent to an area to which a different image processing mode has been set, is extracted on the basis of a result decided in S303. Then, in S305, it is decided whether or not the area, to which the different image processing mode has been set, exists. In the IP converting process in the present embodiment, a result of decided an image processing mode according to the magnitude of movement significantly influences a processed result. Specifically, in a case that the same object is partially included in an area, which is adjacent to an area with large movement, and to which a different image processing mode has been set, continuity of one object is lost and a boundary becomes noticeable.

For example, in an area 5-1 illustrated in FIG. 5, if a different image process is applied to an object (person) continued to an adjacent area 5-2 with large movement, continuity of one object is lost and a division boundary becomes noticeable. Therefore, in S306, a continuity decision of the object is performed to an area, which is adjacent to an area with large movement, and to which a different image processing mode has been set. In case of performing this continuity decision, the feature quantity is compared between a reference area of divided image adjacent to the area with large movement and an effective area having a predetermined width adjacent to this reference area.

Figure 6:
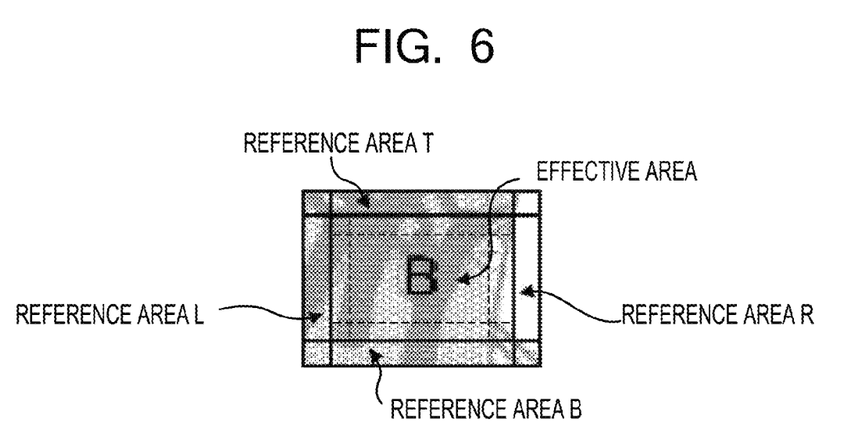
FIG. 6 is a diagram for describing a method of deciding the feature quantity in reference areas and an effective area adjacent to the reference areas.

In the present embodiment, for example, in the area 5-1 illustrated in FIG. 5, the feature quantity is decided with a reference area R and an effective area adjacent to this area R (S307) as illustrated in FIG. 6. As a result of this decision, when the feature quantity of the effective area of a boundary portion is the same as that of the reference area, a set value of the area 5-1 is replaced with a set value of an image processing mode of the area 5-2. That is, since the mode C of a large number of reference frames is set in the area 5-2, a processing mode of the area 5-1 is changed from the mode B to the mode C (S308).

Although the similar decision is also performed to another area, in a case that identity of the feature quantity is not observed, an image processing mode is not changed while keeping the mode B as it is. According to the above process, it is controlled to prevent a case that an image processing mode of a little number of reference frames is partially set at the same object.

As described above, according to the present embodiment, in a case that a significant difference is not observed in an image processing effect between image processing modes to be set, the image processing mode of a little number of reference frames is set every area. In addition, it is decided whether or not an object in each of areas is the same object, and it can be prevented that the image processing mode of a little number of reference frames is partially set within the same object. Incidentally, a deciding method of the present embodiment can be implemented by holding a reference table in which a suitable image processing method is set every classification.

In the conventional video processing apparatus, all the reference frames necessary to obtain the highest image quality are read out from a memory, and a different process is performed in accordance with the feature of an area. In this case, since a constant number of frames are always read out from the memory, large power is consumed as compared with a case of performing a process to an image which includes an area, of which the image quality is slightly deteriorated, even when performing a process by a mode of a little number of reference frames. On the other hand, in the video processing apparatus according to the present embodiment, a high quality image can be obtained and the power consumption can be further reduced by performing a process after deciding an image processing mode of the minimum number of reference frames for the purpose of obtaining a suitable image processing effect from the feature quantity of every area.

(Second Embodiment)

Figure 7:
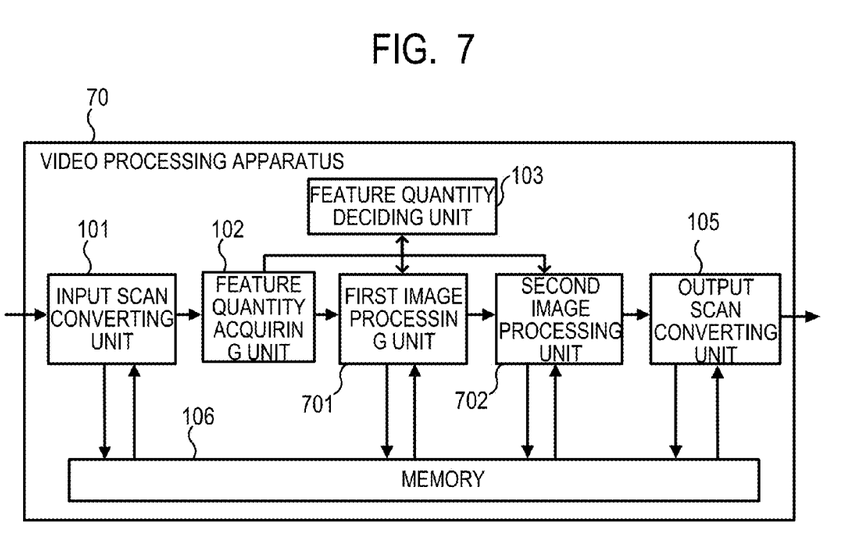
FIG. 7 is a block diagram illustrating an internal constitution example of a video processing apparatus according to a second embodiment of the present invention.

Hereinafter, the second embodiment of the present invention will be described. FIG. 7 is a block diagram illustrating an internal constitution example of a video processing apparatus 70 in the present embodiment. In the present embodiment, a first image processing unit 701 and a second image processing unit 702 are provided instead of the image processing unit 104 in FIG. 1. The first image processing unit 701 corresponds to the image processing unit 104 in FIG. 1. Incidentally, the description of constitution overlapped with that in FIG. 1 will be mitted. Hereinafter, it will be described about a process, to which a frame rate converting process by the second image processing unit 702 is added.

The second image processing unit 702 can perform a process with the four image processing modes (modes A to D) of the different number of reference frames as an algorithm of the frame rate converting process. In the present embodiment, in order to give the description after performing the simplification, it will be described under the condition that an interpolation image for one frame is inserted between the n-th frame and the (n–1)-th frame and then an output is performed after converting to a frame rate which is double of that of an input video image.

In the mode D, a black screen is inserted as an interpolation image between the n-th frame and the (n–1)-th frame. In this case, since the black screen is generated by the second image processing unit 702 and then output, it is not required to access the memory 106. Generally, since the brightness of video image is perceived by an integrated value of an image being displayed in a unit of time, an image is output as a dark video image visually in case of using the present method as compared with a case of using a method of generating an intermediate image. However, in a case that an input image is a dark image, there is such a feature of not visually recognizing the remarkable image quality deterioration even if the present process is used. A memory access amount required for a process of the mode D is zero frame.

In the mode E, the (n–1)-th frame is inserted as an interpolation image between the n-th frame and the (n–1)-th frame. In a case that an input image is a still image area, a suitable interpolation image can be generated with a little memory access amount as compared with a case of using the mode F or the mode G to be described later. On the other hand, since the same frame is repeatedly output, a smooth display is not realized for a movement area as compared with a method of inserting an intermediate image as an interpolation image. A memory access amount required for a process of the mode E is one frame.

In the mode F, in a case that an interpolation image between the n-th frame and the (n–1)-th frame is generated, two frames of the n-th frame and the (n–1)-th frame are read out to perform the matching of corresponding points thereof, and an intermediate image is generated as an interpolation image and then inserted. In this case, an interpolation image to such an image, of which the acceleration is not changed, can be properly generated. On the other hand, a smooth change is not performed to a video image which performs such movement of changing the acceleration. However, in case of the small movement amount, since an error of the position, at which the interpolation pixel was generated, is not conspicuous, a suitable result of almost not having the deterioration can be obtained. A memory access amount required for a process of the mode F is two frames.

In the mode G, four frames from the n-th frame to the (n–3)-th frame are read out to perform the block matching of the corresponding points thereof, and an interpolation image between the n-th frame and the (n–1)-th frame is created. In this case, since an intermediate frame between the n-th frame and the (n–1)-th frame is generated by using a movement vector having the higher accuracy than that in case of the mode F, a display becomes such a display with smoother movement as compared with cases in modes D and E. Further, since the movement vector is generated by referring to a plurality of frames, a suitable interpolation image can be generated also for such a video image of moving while changing the acceleration as compared with a case of the mode F. A memory access amount required for a process of the mode G is four frames.

The feature quantity deciding unit 103 selects image processing modes of the first image processing unit 701 and the second image processing unit 702 in accordance with the feature quantity every rectangular area acquired at the feature quantity acquiring unit 102. Here, in a case that the feature quantity of rectangular area is changed by a process of the first image processing unit 701, a processed result of the first image processing unit 701 is reflected on the threshold decision of the setting of an image processing mode to be set to the image processing unit 702. In the present embodiment, it will be described about a method of deciding a process of the second image processing unit 702 under the condition that a process of converting a gamma curve of input image is assumed to be performed at the first image processing unit 701.

Figure 8A:
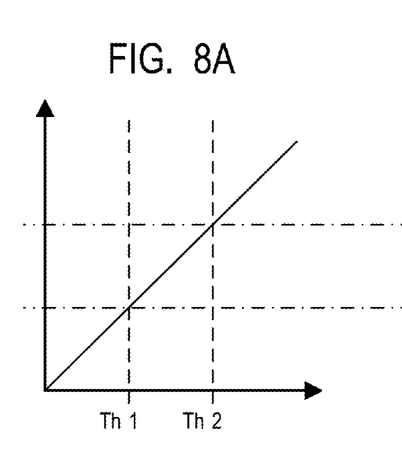
FIGS. 8A and 8B are diagrams illustrating an example of gamma curves before and after the IP converting process.
Figure 8B:
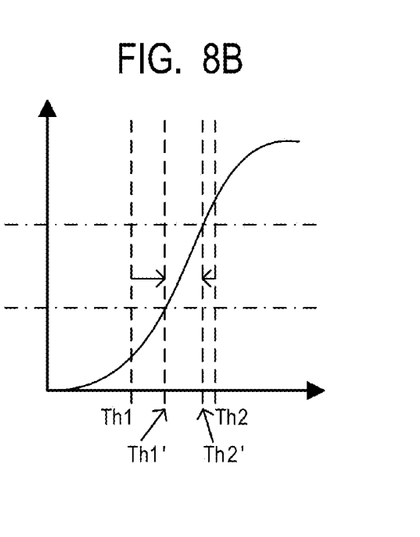

In the present embodiment, the first image processing unit 701 performs a process of steepening the gamma curve of input image. FIGS. 8A and 8B are diagrams respectively illustrating an example of each of gamma curves of input image and output image in the first image processing unit 701. When an image processing mode to be performed at the second image processing unit 702 is selected by using a brightness feature quantity acquired at the feature quantity acquiring unit 102, a gap appears between a result of a process performed by the first image processing unit 701 and the feature quantity of an image to be input to the second image processing unit 702. As a result, an image processing mode which is different from an initially expected mode is selected, and there is possibility of generating the image quality deterioration.

To avoid this situation, in the present embodiment, the processed result of the first image processing unit 701 is made to be reflected on a deciding standard of an image processing mode of the second image processing unit 702. Specifically, thresholds Th1 and Th2 of the feature quantity to be used in the classification decision of brightness indicated in FIG. 8A are changed to thresholds Th1' and Th2' weighted based on a process of the first image processing unit 701 as indicated in FIG. 8B and then the decision is performed. In this manner, the first image processing unit 701 steepens a gamma curve of an input image after performing an image process and changes the thresholds.

The feature quantity deciding unit 103 decides an image processing mode to be set to the second image processing unit 702 on the basis of the feature quantity acquired from the feature quantity acquiring unit 102 and a setting value which was set to the first image processing unit 701. In a case that the feature quantity is changed by the processes after the process of the feature quantity acquiring unit 102, a renewed threshold Th' characterized in that an influence of the image process to be performed as described above is fed back to the threshold Th to be used for the decision of an image process is used for the classification of the feature quantity of an area image.

Figure 9:
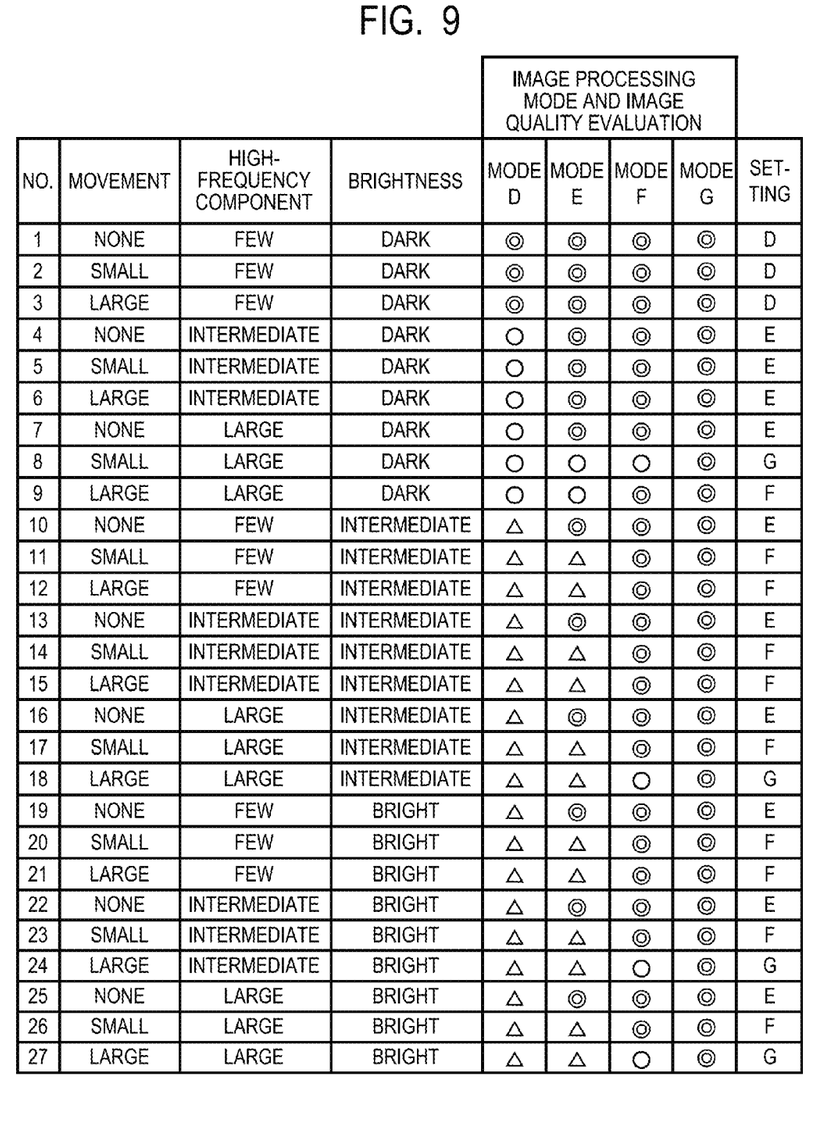
FIG. 9 is a diagram illustrating classification based on image feature quantities in a frame rate converting process and results obtained by processes in respective processing modes.

FIG. 9 is a diagram illustrating classification based on feature quantities to be input to the second image processing unit 702 and an evaluated result of a video image processed by the modes D to G of the second image processing unit 702. As for the second image processing unit 702, an image processing mode is set in accordance with the present decision.

In a case that a method of reacquiring the feature quantity during period from when the feature quantity acquiring unit 102 acquires the feature quantity until when the feature quantity is input to the second image processing unit 702 is provided, the reacquired feature quantity may be used when deciding the image processing mode of the second image processing unit 702. In addition, for example, in a case that the conversion of resolution is performed at the first image processing unit 701, the recalculation of a threshold of a classification deciding expression may be performed in accordance with an enlargement/reduction rate also about the magnitude of a movement vector acquired at the feature quantity acquiring unit 102. In this manner, it may be coped with a process by converting a threshold of each feature quantity in accordance with the process.

As described above, according to the present embodiment, an image processing mode of the smaller number of memory accesses is made to be used in accordance with an image quality evaluation based on the feature quality of each area of an input image in order to obtain image quality which is equivalent to the image quality in case of performing a process with a mode of acquiring the optimum image quality. Accordingly, the power consumption can be reduced without inviting the image quality deterioration as compared with the conventional method. In the present embodiment, although two kinds of processes, that is, an IP converting process and a frame rate converting process have been described, the present embodiment also can be applied to another image process such as a super-resolution process of referring to a plurality of frames.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-263903, filed Dec. 20, 2013, which is hereby incorporated by reference herein in its entirety.

What is claimed is:

1. An image processing apparatus comprising:
   at least one processor;
   a memory for storing instructions to be executed by the at least one processor; and
   at least one circuit,
   wherein when the at least one processor controls the at least one circuit of the image processing apparatus according to the instructions stored in the memory, the processor functioning as:
   an acquiring unit configured to acquire a plurality of image frames constituting a moving image, wherein the plurality of image frames acquired by the acquiring unit are stored in the memory,
   a detecting unit configured to detect a feature quantity of an image frame of the plurality of image frames,
   a determining unit configured to determine a number of image frames to be used for an image process of the image frame, based on the detected feature quantity, and
   an image processing unit configured to perform the image process, including at least one of conversion from an interlace image to a progressive image and conversion of a frame rate, by using image frames that correspond to the number of image frames determined by the determining unit and that are stored in the memory.

2. The image processing apparatus according to claim 1, wherein the detecting unit detects movement information as the feature quantity, and
   wherein, in a case where a movement quantity identified by the movement information is smaller than a threshold, the determining unit determines the number of image frames such that the image process is performed to a process-object frame by using the image frames that correspond to the number of image frames, the number of image frames being smaller than that in a case where the movement quantity is larger than the threshold.

3. The image processing apparatus according to claim 2, wherein the determining unit determines the number of image frames such that, in the case where the movement quantity identified by the movement information is smaller than the threshold, the image process is performed to the process-object frame without referring to an image frame different from the process-object frame, and
  wherein the determining unit determines the number of image frames such that, in the case where the movement quantity is larger than the threshold, the image process is performed to the process-object frame by referring to one or more image frames different from the process-object frame.

4. The image processing apparatus according to claim 2, wherein the determining unit determines the number of image frames such that, in a case where the movement quantity identified by the movement information is larger than a first threshold and smaller than a second threshold, the image process is performed to the process-object frame by referring to one image frame different from the process-object frame, and
  wherein the determining unit determines the number of image frames such that, in a case where the movement quantity is larger than the second threshold, the image process is performed to the process-object frame by referring to a plurality of image frames different from the process-object frame.

5. The image processing apparatus according to claim 1, wherein the detecting unit detects the feature quantity for one or more divided areas of a predetermined size in the image frame, and
  wherein the determining unit determines, for each divided area of the one or more divided areas, the number of image frames to be used for the image process, based on the featured quantity detected by the detecting unit.

6. An image processing method comprising:
  acquiring a plurality of image frames constituting a moving image;
  storing, in a memory, the plurality of image frames acquired in the acquiring step;
  detecting a feature quantity of an image frame of the plurality of image frames;
  determining a number of image frames to be used for an image process of the image frame, based on the detected feature quantity; and
  performing the image process, including at least one of conversion from an interlace image to a progressive image and conversion of a frame rate, by using image frames that correspond to the determined number of image frames and that are stored in the memory.

7. The image processing method according to claim 6, wherein movement information is detected as the feature quantity, and
  wherein, in a case where a movement quantity identified by the movement information is smaller than a threshold, the number of image frames is determined such that the image process is performed to a process-object frame by using the image frames that correspond to the number of image frames, the number of image frames being smaller than that in a case where the movement quantity is larger than the threshold.

8. The image processing method according to claim 7, wherein the number of image frames is determined such that, in the case where the movement quantity identified by the movement information is smaller than the threshold, the image process is performed to the process-object frame without referring to an image frame different from the process-object frame, and
  wherein the number of image frames is determined such that, in the case where the movement quantity is larger than the threshold, the image process is performed to the process-object frame by referring to one or more image frames different from the process-object frame.

9. A non-transitory computer-readable storage medium which stores a program to cause a computer to perform an image processing method, the image processing method comprising:
  an acquiring step of acquiring a plurality of image frames constituting a moving image;
  storing, in a memory, the plurality of image frames acquired in the acquiring step;
  a detecting step of detecting a feature quantity of an image frame of the plurality of image frames;
  a determining step of determining a number of image frames to be used for an image process of the image frame, based on the detected feature quantity; and
  an image processing step of performing the image process, including at least one of conversion from an interlace image to a progressive image and conversion of a frame rate, by using image frames that correspond to the number of image frames determined in the determining step and that are stored in the memory.

10. The non-transitory computer-readable storage medium according to claim 9, wherein the detecting step detects movement information as the feature quantity, and
  wherein, in a case where a movement quantity identified by the movement information is smaller than a threshold, the determining step determines the number of image frames such that the image process is performed to a process-object frame by using the image frames that correspond to the number of image frames, the number of image frames being smaller than that in a case where the movement quantity is larger than the threshold.

11. The non-transitory computer-readable storage medium according to claim 10, wherein the determining step determines the number of image frames such that, in the case where the movement quantity identified by the movement information is smaller than the threshold, the image process is performed to the process-object frame without referring to an image frame different from the process-object frame, and
  wherein the determining step determines the number of image frames such that, in the case where the movement quantity is larger than the threshold, the image process is performed to the process-object frame by referring to one or more image frames different from the process-object frame.

* * * * *